United States Patent
Chen et al.

(10) Patent No.: US 8,743,312 B2
(45) Date of Patent: Jun. 3, 2014

(54) FIXING STRUCTURE FOR PRINTED CIRCUIT BOARD ASSEMBLY AND LIQUID CRYSTAL DISPLAY USING THE SAME

(75) Inventors: Shih-Hsiang Chen, Guangdong (CN); Gege Zhou, Guangdong (CN)

(73) Assignee: Shenzhen China Star Optoelectronics Technology Co., Ltd., Shenzhen, Guangdon (CN)

( * ) Notice: Subject to any disclaimer, the term of this patent is extended or adjusted under 35 U.S.C. 154(b) by 78 days.

(21) Appl. No.: 13/515,235

(22) PCT Filed: Apr. 17, 2012

(86) PCT No.: PCT/CN2012/074187
§ 371 (c)(1),
(2), (4) Date: Jun. 11, 2012

(87) PCT Pub. No.: WO2013/143189
PCT Pub. Date: Oct. 3, 2013

(65) Prior Publication Data
US 2013/0258238 A1  Oct. 3, 2013

(30) Foreign Application Priority Data
Mar. 27, 2012  (CN) .......................... 2012 1 0084596

(51) Int. Cl.
*G02F 1/1333* (2006.01)
(52) U.S. Cl.
USPC ........................................................ 349/58

(58) Field of Classification Search
USPC ............................................................ 349/58
See application file for complete search history.

(56) References Cited

U.S. PATENT DOCUMENTS

| 8,223,292 B2 * | 7/2012 | Yoshikawa ..................... 349/58 |
| 2010/0259704 A1 | 10/2010 | Fu et al. | |
| 2011/0122333 A1 * | 5/2011 | Kim et al. ....................... 349/58 |

FOREIGN PATENT DOCUMENTS

| CN | 101063770 A | 10/2007 |
| CN | 101154554 A | 4/2008 |
| CN | 101769480 A | 7/2010 |
| TW | 201028763 A | 8/2010 |

* cited by examiner

*Primary Examiner* — James Dudek
(74) *Attorney, Agent, or Firm* — Muncy, Geissler, Olds & Lowe, P.C.

(57) ABSTRACT

The liquid crystal display comprises a display panel, a flexible circuit board, a printed circuit board assembly, and a fixing structure which comprises a back plate comprising a first bending element comprising a first vertical surface being connected to the back plate and a first flat surface, an edge of the first flat surface being connected to the first vertical surface so that the first vertical surface and the first flat surface forming a first hook element opening and a second bending element comprising a second vertical surface being connected to the back plate and a second flat surface, an edge of the second flat surface being connected to the second vertical surface so that the second vertical surface and the second flat surface forming a second hook element opening, the second hook element opening and the first hook element opening being faced to an opposite direction.

7 Claims, 3 Drawing Sheets

FIXING STRUCTURE FOR PRINTED CIRCUIT BOARD ASSEMBLY AND LIQUID CRYSTAL DISPLAY USING THE SAME

FIELD OF THE INVENTION

The present invention relates to a fixing structure and a liquid crystal display using the fixing structure and more particularly to a fixing structure for fixing a printed circuit board assembly and a liquid crystal display using the fixing structure.

BACKGROUND OF THE INVENTION

FIG. 1 is sectional view of a conventional liquid crystal display. As shown in FIG. 1, a liquid crystal display 9 comprises a display panel 920, a chip on film (COF) 930, a back plate 980, a printed circuit board assembly (PCBA) 990, a front frame 910, a plastic frame 940, an optical film 950, a light guide plate (LGP) 960 and a reflective film 970.

The display panel 920 is disposed on the plastic frame 940. The chip on film 930 is electrically connected to the display panel 920 and the printed circuit board assembly 990. The printed circuit board assembly 990 is disposed on the back plate 980. The printed circuit board assembly 990 controls the display panel 920 to display images via the chip on film 930. The reflective film 970, the light guide plate 960 and the optical film 950 are disposed sequentially between the back plate 980 and the plastic frame 940. The front frame 910 is disposed on the display panel 920 and on an outer side of the back plate 980 so that the display panel 920 is fixed by the front frame 910 and the back plate 980.

In the conventional techniques, screw or viscose glue is used for fixing the printed circuit board assembly 990 on the back plate 980. The material cost and manpower cost for using either screw or viscose glue are relatively high.

In order to overcome the above problems, a fixing structure for a printed circuit board assembly and a liquid crystal display using the fixing structure are provided by the present invention to reduce the material cost and manpower cost.

SUMMARY

One objective of the present invention provides a fixing structure for a printed circuit board assembly which can overcome the drawbacks of the conventional technique for fixing a printed circuit board assembly. By using the fixing structure for a printed circuit board assembly of the present invention, the problems of high material cost and manpower cost caused by using screw or viscose glue in fixing a printed circuit board assembly can be solved.

Another objective of the present invention provides a liquid crystal display using the fixing structure which can overcome the drawbacks of the conventional liquid crystal display. By employing the liquid crystal display using the fixing structure of the present invention, the problems of high material cost and manpower cost caused by using screw or viscose glue in fixing a printed circuit board assembly can be solved.

In order to achieve the abovementioned objectives, the fixing structure provided by the present invention is disposed on a back plate of a backlight module for fixing a printed circuit board assembly. The fixing structure comprising a first bending element comprising a first vertical surface and a first flat surface, the first vertical surface being connected to the back plate, an edge of the first flat surface being connected to the first vertical surface so that the first vertical surface and the first flat surface forming a first hook element opening; and a second bending element comprising a second vertical surface and a second flat surface, the second vertical surface being connected to the back plate, an edge of the second flat surface being connected to the second vertical surface so that the second vertical surface and the second flat surface forming a second hook element opening, the second hook element opening and the first hook element opening being faced to an opposite direction, wherein the first hook element opening and the second hook element opening are used for fixing the printed circuit board assembly.

The first bending element and the second bending element of the fixing structure are disposed oppositely to each other. The first hook element opening faces the second hook element opening.

The first bending element and the second bending element of the fixing structure are disposed alternatively to each other. The first hook element opening and the second hook element opening are faced to an opposite direction.

The back plate and the first bending element as well as the second bending element of the fixing structure are made of a same material.

The back plate and the first bending element as well as the second bending element of the fixing structure are composed of metal materials.

In order to achieve the abovementioned objectives, the liquid crystal display provided by the present invention comprising a display panel; a flexible circuit board electrically connected to the display panel; a printed circuit board assembly electrically connected to the flexible circuit board; and a fixing structure for fixing the printed circuit board assembly. The fixing structure comprises a back plate, wherein the back plate comprises a first bending element comprising a first vertical surface and a first flat surface, the first vertical surface being connected to the back plate, an edge of the first flat surface being connected to the first vertical surface so that the first vertical surface and the first flat surface forming a first hook element opening; and a second bending element comprising a second vertical surface and a second flat surface, the second vertical surface being connected to the back plate, an edge of the second flat surface being connected to the second vertical surface so that the second vertical surface and the second flat surface forming a second hook element opening, the second hook element opening facing the first hook element opening. The first hook element opening and the second hook element opening are used for fixing the printed circuit board assembly.

The first bending element and the second bending element of the liquid crystal display are disposed oppositely to each other. The first hook element opening faces the second hook element opening.

The first bending element and the second bending element of the liquid crystal display are disposed alternatively to each other. The first hook element opening and the second hook element opening are faced to an opposite direction.

The back plate and the first bending element as well as the second bending element of the liquid crystal display are made of a same material.

The flexible circuit board of the liquid crystal display is a chip on film.

As a conclusion from the above, a fixing structure and a liquid crystal display using the fixing structure provided by the present invention have an advantageous effect in that: by using the first bending element and the second bending element on the back plate to fix the printed circuit board assembly, the material cost and manpower cost in assembling can be reduced. Therefore, the time for assembling the liquid crystal display is speed up. Furthermore, the back plate, the first bending element and the second bending element can be used for the grounding connection of the printed circuit board assembly. The noise produced by the circuits on the printed circuit board assembly can be reduced and the image quality of the display panel can be enhanced.

The present invention will become more fully understood by reference to the following detailed description thereof when read in conjunction with the attached drawings.

DETAILED DESCRIPTION OF THE INVENTION

Figure 1:
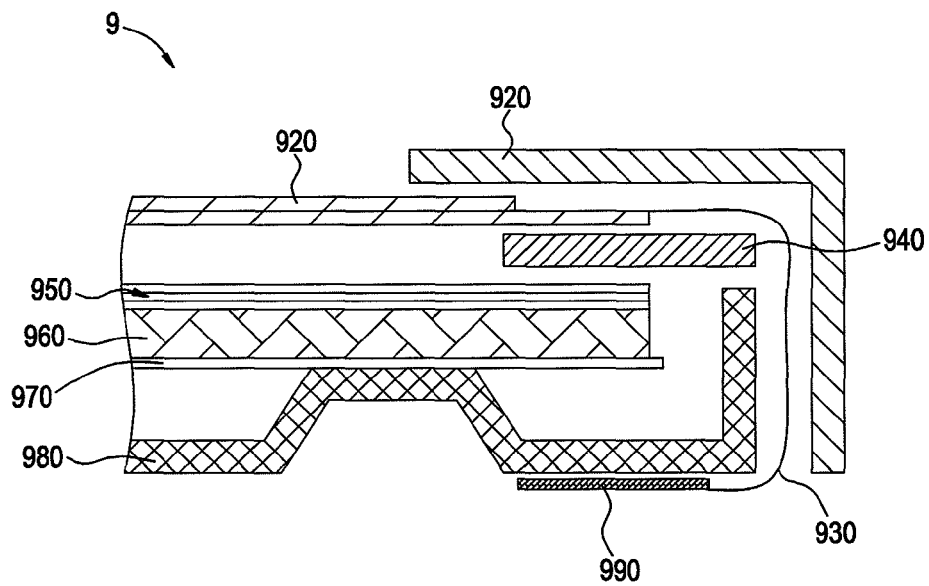
FIG. 1 is sectional view of a conventional liquid crystal display.
Figure 2:
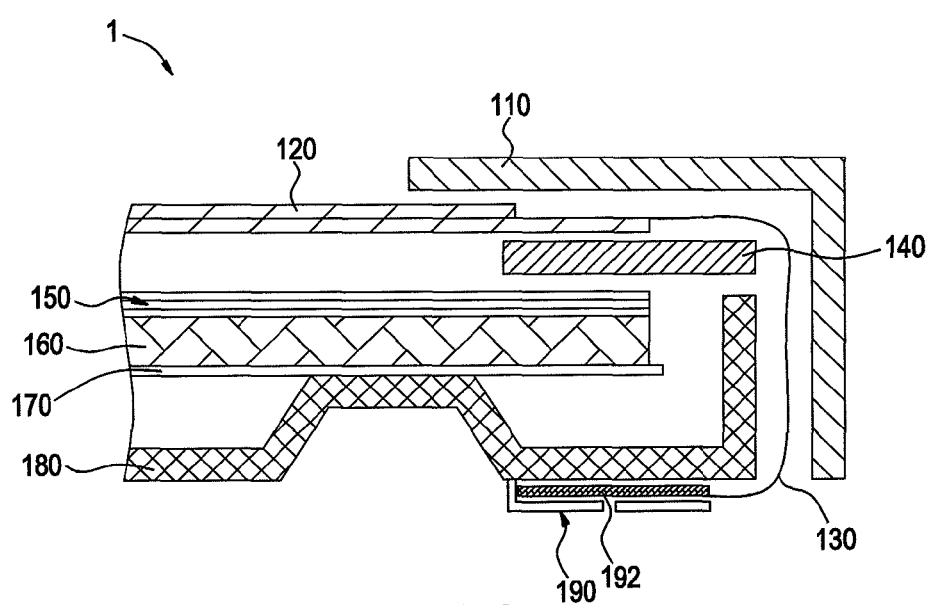
FIG. 2 is sectional view of a liquid crystal display according to an embodiment of the present invention.

FIG. 2 is sectional view of a liquid crystal display according to an embodiment of the present invention. As shown in FIG. 2, a liquid crystal display 1 comprises a display panel 120, a flexible circuit board 130, a backlight module, a printed circuit board assembly (PCBA) 192, a front frame 110 and a plastic frame 140. The backlight module comprises a back plate 180, a fixing structure 190, an optical film 150, a light guide plate (LGP) 160 and a reflective film 170.

The display panel 120 is disposed on the plastic frame 140. The reflective film 170, the light guide plate 160 and the optical film 150 are disposed sequentially between the back plate 180 and the plastic frame 140. The flexible circuit board 130 is electrically connected to the display panel 120 and the printed circuit board assembly 192. The printed circuit board assembly 192 is disposed on the back plate 180 by using the fixing structure 190. The printed circuit board assembly 192 controls the display panel 120 to display images via the flexible circuit board 130. The front frame 110 is disposed on the display panel 120 and on an outer side of the back plate 180 so that the display panel 120 is fixed by the front frame 110, the back plate 180 and the plastic frame 140. In the embodiment of the present invention, the flexible circuit board 130 is a chip on film (COF). In the embodiment of the present invention, the fixing structure 190 can be adjusted as a fixing structure of a first embodiment, or a fixing structure of a second embodiment, or a combination of a fixing structure of a first embodiment and a fixing structure of a second embodiment mentioned below according to the size of the printed circuit board assembly.

Figure 3:
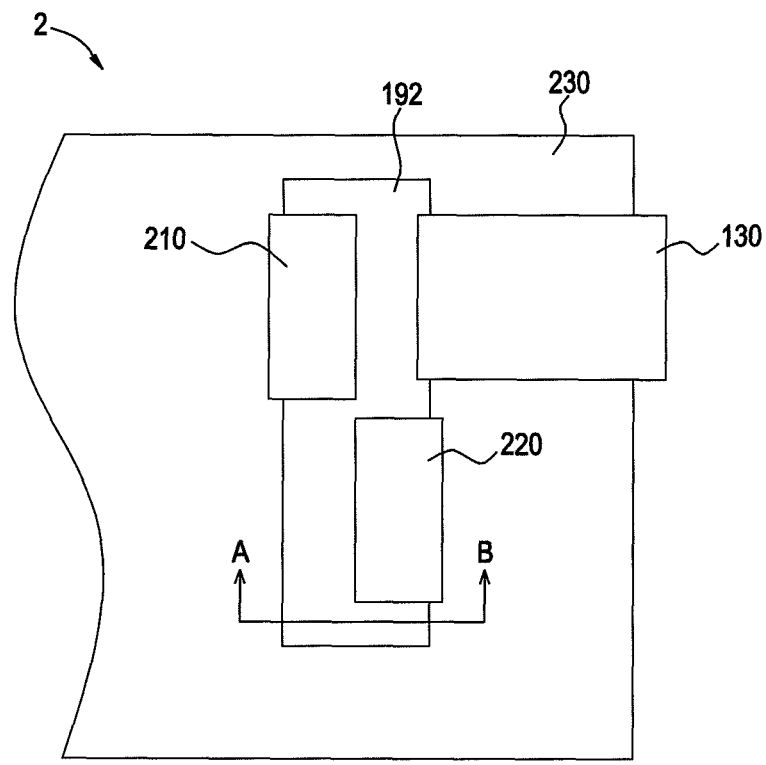
FIG. 3 is a top view of the fixing structure according to a first embodiment of the present invention.
Figure 4:
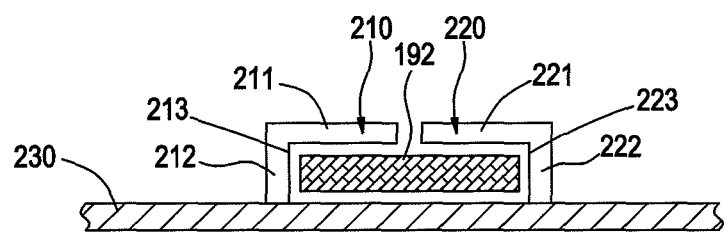
FIG. 4 is a sectional view of FIG. 3 along line AB.

Please refer to FIGS. 3 and 4. FIG. 3 is a top view of the fixing structure according to a first embodiment of the present invention. FIG. 4 is a sectional view of FIG. 3 along line AB. A fixing structure 2 comprises a back plate 230, a first bending element 210 and a second bending element 220. The first bending element 210 comprises a first vertical surface 212, a first flat surface 211 and a first hook element opening 213. The second bending element 220 comprises a second vertical surface 222, a second flat surface 221 and a second hook element opening 223. For clear illustration, the printed circuit board assembly 192 and the flexible circuit board 130 are also shown in FIGS. 3 and 4. The printed circuit board assembly 192 is electrically connected to the flexible circuit board 130.

The first vertical surface 212 of the first bending element 210 is vertically connected to the back plate 230. An edge of the first flat surface 211 is connected to an edge of the first vertical surface 212. Therefore, the first vertical surface 212 and the first flat surface 211 form the first hook element opening 213. The second vertical surface 222 of the second bending element 220 is vertically connected to the back plate 230. An edge of the second flat surface 221 is connected to an edge of the second vertical surface 222. Therefore, the second vertical surface 222 and the second flat surface 221 form the second hook element opening 223. The second hook element opening 223 and the first hook element opening 213 are faced to an opposite direction. The first bending element 210 and the second bending element 220 are disposed alternatively to each other. The first hook element opening 213 is faced to the right and the second hook element opening 223 is faced to the left. That means the first hook element opening 213 and the second hook element opening 223 are faced to an opposite direction. A space formed by the first hook element opening 213 and the second hook element opening 223 is used for accommodating and fixing the printed circuit board assembly 192. The back plate 230 and the first bending element 210 as well as the second bending element 220 in the first embodiment of the present invention are made of a same metal material. Therefore, the back plate 230 and the first bending element 210 as well as the second bending element 220 can be integrally formed by a stamping process. Because the back plate 230 and the first bending element 210 as well as the second bending element 220 are made of metal materials, the back plate 230 and the first bending element 210 as well as the second bending element 220 can be used as the grounding connection for the printed circuit board assembly 192.

Figure 5:
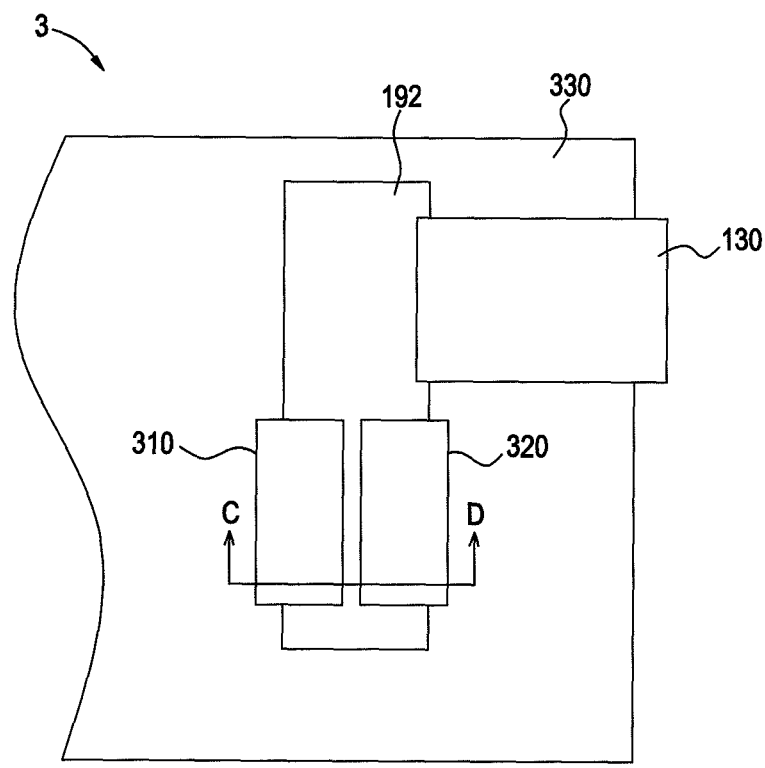
FIG. 5 is a top view of the fixing structure according to a second embodiment of the present invention.
Figure 6:
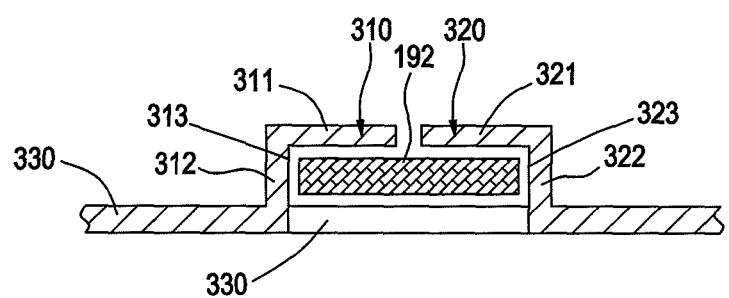
FIG. 6 is a sectional view of FIG. 5 along line CD.

Please refer to FIGS. 5 and 6. FIG. 5 is a top view of the fixing structure according to a second embodiment of the present invention. FIG. 6 is a sectional view of FIG. 5 along line CD. A fixing structure 3 comprises a back plate 330, a first bending element 310 and a second bending element 320. The first bending element 310 comprises a first vertical surface 312, a first flat surface 311 and a first hook element opening 313. The second bending element 320 comprises a second vertical surface 322, a second flat surface 321 and a second hook element opening 323. For clear illustration, the printed circuit board assembly 192 and the flexible circuit board 130 are also shown in FIGS. 5 and 6. The printed circuit board assembly 192 is electrically connected to the flexible circuit board 130.

The first vertical surface 312 of the first bending element 310 is vertically connected to the back plate 330. An edge of the first flat surface 311 is connected to an edge of the first vertical surface 312. Therefore, the first vertical surface 312 and the first flat surface 311 form the first hook element opening 313. The second vertical surface 322 of the second bending element 320 is vertically connected to the back plate 330. An edge of the second flat surface 321 is connected to an edge of the second vertical surface 322. Therefore, the second vertical surface 322 and the second flat surface 321 form the second hook element opening 323. The second hook element opening 323 faces the first hook element opening 313. The first bending element 310 and the second bending element 320 are disposed oppositely to each other. The first hook element opening 313 is faced to the right and the second hook element opening 323 is faced to the left. That means the first hook element opening 313 and the second hook element opening 323 are faced to an opposite direction. A space formed by the first hook element opening 313 and the second hook element opening 323 is used for accommodating and fixing the printed circuit board assembly 192. The back plate 330 and the first bending element 310 as well as the second bending element 320 in the second embodiment of the present invention are made of a same metal material. Therefore, the back plate 330 and the first bending element 310 as well as the second bending element 320 can be integrally formed by a stamping process. Because the back plate 330 and the first bending element 310 as well as the second bending element 320 are made of metal, the back plate 330 and the first bending element 310 as well as the second bending element 320 can be used as the grounding connection for the printed circuit board assembly 192.

As a conclusion from the above, by using the first bending element and the second bending element on the back plate to fix the printed circuit board assembly, the fixing structure for fixing the printed circuit board assembly and the liquid crystal display using the fixing structure can reduce the material cost and manpower cost in assembling. Therefore, the time for assembling the liquid crystal display is speed up. Furthermore, the back plate, the first bending element and the second bending element can be used for the grounding connection of the printed circuit board assembly. The noise produced by the circuits on the printed circuit board assembly can be reduced and the image quality of the display panel can be enhanced.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A fixing structure disposed on a back plate of a backlight module for fixing a printed circuit board assembly, wherein the fixing structure comprises:
   a first bending element comprising a first vertical surface and a first flat surface, the first vertical surface being connected to the back plate, an edge of the first flat surface being connected to the first vertical surface so that the first vertical surface and the first flat surface forming a first hook element opening; and
   a second bending element comprising a second vertical surface and a second flat surface, the second vertical surface being connected to the back plate, an edge of the second flat surface being connected to the second vertical surface so that the second vertical surface and the second flat surface forming a second hook element opening, the second hook element opening and the first hook element opening being faced to an opposite direction;
   wherein the first hook element opening and The second hook element opening are used for fixing the printed circuit board assembly on the back plate, the first bending element and the second bending element of the fixing structure are disposed oppositely to each other, the first hook element opening faces the second hook element opening, the first bending element as well as the second bending element are made of a same material, and the first bending element as well as the second bending element are composed of metal materials, and
   wherein the first vertical surface and the first flat surface form a first angle being 90 degrees, and the second vertical surface and the second flat surface form a second angle being 90 degrees.

2. A fixing structure disposed on a back plate of a backlight module for fixing a printed circuit board assembly, wherein the fixing structure comprises:
   a first bending element comprising a first vertical surface and a first flat surface, the first vertical surface being connected to the back plate, an edge of the first flat surface being connected to the first vertical surface so that the first vertical surface and the first flat surface forming a first hook element opening; and
   a second bending element comprising a second vertical surface and a second flat surface, the second vertical surface being connected to the back plate, an edge of the second flat surface being connected to the second vertical surface so that the second vertical surface and the second flat surface forming a second hook element opening, the second hook element opening and the first hook element opening being faced to an opposite direction,
   wherein the first hook element opening and the second hook element opening are used for fixing the printed circuit board assembly on the back plate, and
   wherein the first bending element and the second bending element are disposed alternatively to each other.

3. The fixing structure of claim 2, wherein the back plate and the first bending element as well as the second bending element are made of a same material.

4. The fixing structure of claim 2, wherein the back plate and the first bending element as well as the second bending element are composed of metal materials.

5. A liquid crystal display comprises:
   a display panel;
   a flexible circuit board electrically connected to the display panel;
   a printed circuit board assembly electrically connected to the flexible circuit board; and
   a fixing structure for fixing the printed circuit board assembly, comprising:
   a back plate, comprising:
   a first bending element comprising a first vertical surface and a first flat surface, the first vertical surface being connected to the back plate, an edge of the first flat surface being connected to the first vertical surface so that the first vertical surface and the first flat surface forming a first hook element opening; and
   a second bending element comprising a second vertical surface and a second flat surface, the second vertical surface being connected to the back plate, an edge of the second flat surface being connected to the second vertical surface so that the second vertical surface and the second flat surface forming a second hook element opening, the second hook element opening and the first hook element opening being faced to an opposite direction;
   wherein the first hook element opening and the second hook element opening are used for fixing the printed circuit board assembly on the back plate, and
   wherein the first bending element and the second bending element are disposed alternatively to each other.

6. The liquid crystal display of claim 5, wherein the back plate and the first bending element as well as the second bending element are made of a same material.

7. The liquid crystal display of claim 5, wherein the flexible circuit board is a chip on film.

* * * * *